Patented July 19, 1927.

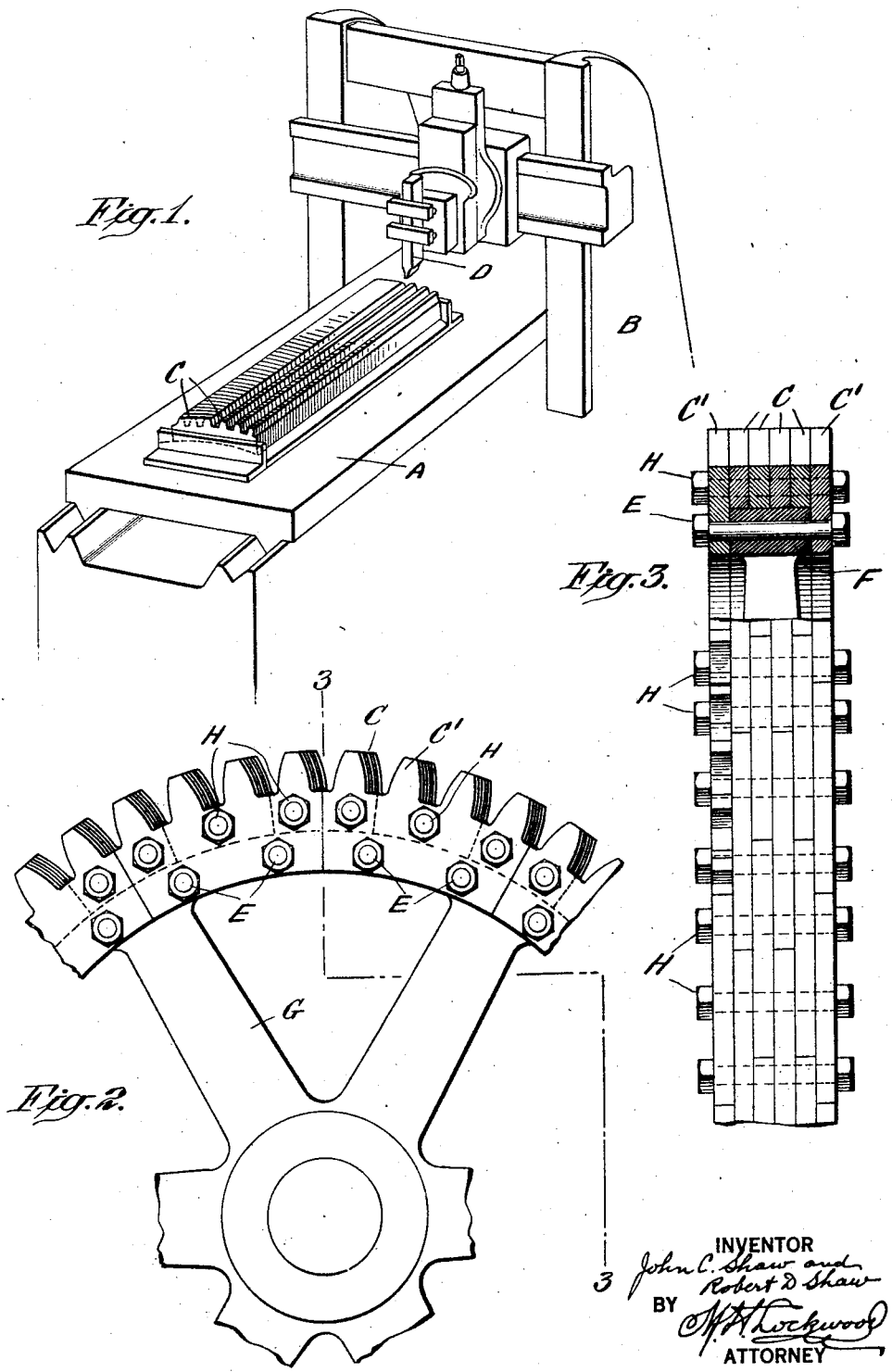

1,636,670

UNITED STATES PATENT OFFICE.

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

METHOD OF MAKING SEGMENTAL LAMINATED GEARS.

Application filed April 15, 1925. Serial No. 23,191.

Our improvement relates more particularly to an improved method of constructing gears of large diameter and preferably laminated stepped gears, which may be used in place of spiral or herring-bone type of gears. In cutting spiral or herring-bone gears of large diameter, the expense is very great, on account of the heavy machinery and equipment required to satisfactorily do the job.

Gears of large diameter as heretofore made are usually made of cast iron, the face turned down and the gear teeth then cut out of the solid metal, thus requiring a heavy equipment and special tools for cutting the teeth. Therefore, the object of our improvement is to provide a comparatively low cost method of manufacturing gears of various widths of face and of large diameter. It is preferable that the teeth of such gears should be made of steel, so as to give maximum wear and service and according to my method, this is easily possible for the lamina segments on which the gear teeth are cut, prior to assembly on the wheels may be made of thin plates of cast, forged on sheet steel, while the body and rim of the gear wheel is of cast iron or other suitable materials.

In carrying out our improvement, a plurality of segmental blanks within the capacity of the machine, are preferably assembled in compact parallel relation on the table of a planer or milling machine and a predetermined number of gear teeth cut on the edges of the blanks, the number of teeth so cut being determined by the length of the segments. The segmental blanks, prior to cutting, may be punched or shaped in proper segmental arcs, preferably of equal lengths, to complete the circle of the wheel rim.

The gear teeth cut on the load of segments on the planer or milling machine are preferably cut by a roughing out cut, after which the segments are heat treated, hardened and tempered, then the gear teeth are finished, either by a light cut or by grinding.

Since it is desirable in large gears of this type to distribute the gear tooth pressure, it is preferable to assemble the circles of lamina segments in stepped relation, to thereby produce the effect of the spiral gear or the herring-bone gear. For this purpose, the perforations in the segments are properly advanced and the various segments and lamina assembled accordingly.

We are aware that laminated gears have been used and also that the art discloses the segmental construction of such gears, but these prior constructions are not readily adaptable for the manufacture of gears of large diameter and hence my improved method, while being adapted for gears of large diameter, is particularly novel in the preliminary production of a large number of toothed gear segments of uniform size, which are heat treated, hardened and finished before assembling them to complete the finished laminated gear wheel.

For the purpose of illustrating our improved segmental laminated gear and the method of production, we have shown in Fig. 1 of the accompanying drawings, a perspective view of part of a planer, upon the bed of which there is mounted in compact form a plurality of thin segmental lamina and indicating the way the teeth are cut therein; Fig. 2 represents, in side elevation, a portion of a large diameter gear, the teeth of which are formed according to our method with segmental stepped lamina; and Fig. 3 is a fragment of the gear, looking at the face thereof, with a portion in section on the line 3—3 of Fig. 2, to show the method of securing the segmental lamina to each other and to the rim of the wheel.

Referring to the drawings, it will be seen that in Fig. 1, the reciprocating table A of a planer B is loaded to capacity with a plurality of segment blanks C, which are secured to the table of the planer in any suitable manner, the thin plate-like segments being arranged in parallel relation transversely of the direction of motion of the reciprocating table. According to our method, the entire load of segmental blanks C is, in this manner, adapted to be reciprocated under the tool D, which is preferably shaped to correspond with the desired gear teeth to be cut in the segments. Obviously, the shape of the teeth will be varied slightly according to the number of teeth and the diameter of the gear wheel, to which the segments are to be attached, and of which the blanks are proper segmental arcs. According to our method, the teeth in the plurality of segment blanks on the table of the planer or milling machine are preferably rough cut and then the segments, which, as previously stated are preferably of thin plates of cast, forged or sheet steel, are heat-treated and hardened, preferably tempering them to a hardness which will permit them being remachined for the finishing cut on a planer or milling machine. Obviously, if desired, the roughed-out blanks may be heat-treated and hardened and the gear teeth finished by grinding.

According to our method, it will be seen that a large quantity of segments can be cut and finished with the ordinary equipment of a machine shop and the segments afterwards assembled on the rim of a wheel of large diameter to complete the gear. Thus, even though a moderate number of gears are required, the number of segments would be very large and, therefore, the relative cost for the equipment necessary to produce the segments would be so distributed that it would pay even a small shop to equip for the manufacture of gears of this character, and such gears, according to our method, can be produced at a considerable saving over the cost of solid gears of the same diameter.

In Figs. 2 and 3, we have illustrated a fragmentary position of a gear of large diameter, made according to our method, the thin segmental plates C and C′ preferably being assembled in stepped relation as indicated in the drawings, to thereby form a laminated stepped gear, which may be used as a substitute for spirally cut or herringbone type of gears. The outside lamina segments C′ are preferably made wider and placed on each side of the lamina segments C as indicated in Fig. 3 of the drawings, and bolts E are passed through perforations in the segments and through the rim F of the large wheel G, thereby securing the gear segments to the periphery of the wheel in proper relation thereto. The intermediate lamina C are secured on the face of the rim F to the lamina C′ by bolts H passed through suitable perforations in the lamina, as indicated in Fig. 3 of the drawings.

In order that the stepped relation between the lamina may be effected, the position of the perforations for the bolts H should be varied accordingly, but since, in a gear of large diameter, the segments C are preferably of short length, and contain only a few gear teeth, and the number of segments required will be quite large, tools for duplicating the position of the holes or perforations in the segments can be utilized. Obviously, the length of arc of the segments, which are mounted in end to end relation about the periphery of the large diameter gear wheel may be varied according to requirements, and, likewise, the number of teeth carried by each segment may be varied, according to the size of the teeth and the requirements in cutting and tempering the metal to obtain the desired results.

It will thus be seen that we have devised a novel method of constructing large gears to obtain maximum strength of the gear teeth, by employing hardened steel segments, and gears of large diameter may be readily manufactured at a minimum cost and with a moderate equipment of tools, such as may be built and used in the ordinary machine shop, which otherwise could not handle the job of manufacturing gears of large diameter.

While we have shown and described one form of our improved large diameter laminated segmental gears and the method of producing the same, it will be understood that we do not wish to be limited to the specific details described, for obviously, various modifications may be made in carrying out our invention without departing from the spirit and scope thereof.

We claim:—

1. The method of forming laminated gears, which comprises assembling a plurality of segmental lamina blanks in parallel relation, then cutting a predetermined number of gear teeth in said assembled lamina, then heat-treating the cut lamina segments, then finishing the gear teeth and thereafter assembling the lamina segments in proper cooperative relation to form the completed gear.

2. The method of forming a laminated gear, which comprises assembling a plurality of thin segmental blanks in parallel relation, then rough-cutting a predetermined number of gear teeth in said assembled blanks, then heat treating the cut segments, then subjecting the rough-cut segments to a finishing operation to complete the teeth, then assembling the segmental lamina in a plurality of layers in end to end relation to complete the gear, the arrangement being such that adjacent lamina break joints.

3. The method of forming laminated gears of large diameter, which comprises assembling a plurality of segmental lamina blanks in parallel relation, then in one operation rough-cutting a predetermined number of gear teeth in the assembled blanks according to the length of the segments, then heat treating said rough-cut segment lamina, then operating on said rough-cut segments to finish the gear teeth, then assembling the finished segmental lamina in end to end relation in a plurality of circles around the periphery of a rimmed wheel and securing them together and to the rim of the wheel to complete the gear, the arrangement being such that adjacent circles of lamina break joints.

JOHN C. SHAW.
ROBERT D. SHAW.